United States Patent
Palfenier et al.

(10) Patent No.: US 6,563,304 B1
(45) Date of Patent: May 13, 2003

(54) PROTECTIVE TERMINAL BUMPS FOR THE VARIABLE RELUCTANCE SENSOR

(75) Inventors: Samuel Roland Palfenier, El Paso, TX (US); Cecilia Hernandez, Cd. Juarez Chih. (MX); Stephen G Paddock, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/078,855

(22) Filed: Feb. 19, 2002

(51) Int. Cl.[7] .............................. G01B 7/30; G01P 3/488; H01F 27/29
(52) U.S. Cl. ................ 324/207.15; 324/174; 336/192
(58) Field of Search ........................ 324/173, 174, 324/207.15, 207.16, 207.25; 73/660, 661, 514.39; 336/192; 310/155, 168; 29/595, 602.1, 605, 606; 439/259–260

(56) References Cited

U.S. PATENT DOCUMENTS

| | | | |
|---|---|---|---|
| 4,829,245 A | * 5/1989 | Echasseriau et al. | 324/174 |
| 5,121,056 A | * 6/1992 | Onishi et al. | 324/207.15 |
| 5,507,089 A | * 4/1996 | Dickmeyer | 29/605 |
| 5,877,625 A | * 3/1999 | Togo et al. | 324/174 |
| 5,998,988 A | * 12/1999 | Dickmeyer et al. | 324/174 |
| 2002/0177341 A1 | * 11/2002 | Stein et al. | 439/260 |

* cited by examiner

*Primary Examiner*—Jay Patidar
(74) *Attorney, Agent, or Firm*—Margaret A. Dobrowitsky

(57) ABSTRACT

In an electronic sensor having a spool with a bore therein for receiving a pole and a magnet adjacent to the pole and a magnet wire wound around the spool forming a coil and the ends of the magnet wire are each coiled around respective electrically conductive legs of a terminal for electrical output from the coil to an external circuit, the legs of the terminal are provided with bumps or protuberances stamped thereon. The bumps have a height greater than the thickness of the magnet wire to protect the magnet wire during installation of a housing covering.

7 Claims, 2 Drawing Sheets

PROTECTIVE TERMINAL BUMPS FOR THE VARIABLE RELUCTANCE SENSOR

FIELD OF THE INVENTION

The invention relates to electronic sensors, and more particularly to protection of the terminals and wires on electronic sensors.

BACKGROUND OF THE INVENTION

Electronic sensors, and more particularly, variable reluctance sensors are well known and used in automotive applications such as brake systems, cruise control systems, transmission systems, as well as others. In general, variable reluctance sensors include a bobbin or spool assembly having a non-metal spool which houses magnetic elements and magnet wire. The magnet wire is coiled about a barrel portion of the spool. The end wires of the magnet wire are wrapped around terminal legs for electrical output to an external circuit. The spool assembly is then encapsulated within a metal or plastic housing. The encapsulating process includes sealing the magnetic elements and magnet wire from liquid intrusion, so that the variable reluctance sensor is protected in its environment on the vehicle from corrosive liquids, splash, spill, or other debris. During the encapsulating process, a cap is slid over the spool assembly and the end wires wound around the terminal legs. As the cap slides over the end wires, the wires may be inadvertently damaged or scuffed by the moving cap. A damaged magnet wire can result in an "open circuit" failure condition. Variable reluctance sensors are required to have a reliability and a design life to match warranty target periods of 100,000 to 200,000 miles of the associated vehicle. Failure of the variable reluctance sensor may result in poor engine performance of the vehicle. Consequently, there is a need for designing the variable reluctance sensor, and especially the terminal of the variable reluctance sensor so that the end wires are not damaged upon installation of the cap.

SUMMARY OF THE INVENTION

The invention is an improvement to an electronic sensor having a spool assembly. The spool assembly includes a spool with a cavity therein for receiving a pole piece and a magnet adjacent the pole piece. A magnet wire is coiled around the spool. Each end of the magnet wire is coiled around a respective electrical conductive terminal leg for electrical output from the coil to an external circuit. A cap slides over the spool assembly and the terminal legs for sealing the components from liquid and debris. The improvement to the electronic sensor includes bumps or protuberances stamped onto the terminal legs. The bumps or protuberances have a height greater than the diameter of the wire or bundle of wires coiled around the terminal leg.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 3:
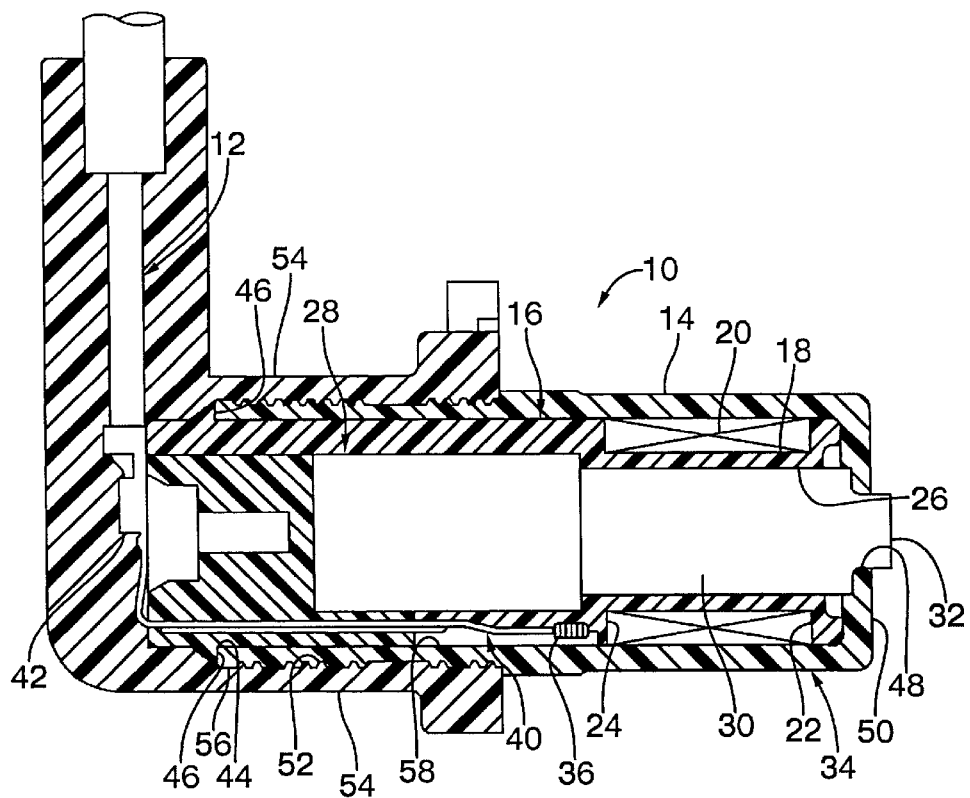
FIG. 3 is a front cross sectional view of a conventional fully assembled variable reluctance sensor.

Referring initially to FIG. 3, there is shown a conventional electronic sensor, and more particularly a variable reluctance sensor 10. The sensor 10 is shown connected to a conventional electronic harness 12 which ultimately communicates with an exterior circuit (not shown). The sensor 10 includes a bobbin or spool assembly 14 including a spool portion 16 having a barrel 18 around which magnet wire 20 is wound. The magnet wire 20 may be wound as a single strand or as a bundle of wire strands. The spool barrel 18 is generally de-limited at its opposite ends by bottom and top flanges 22, 24 respectively. Axially extending completely through the spool barrel 18 and beyond the flanges 22, 24 is a bore 26. In the illustrated embodiment of a conventional sensor 10 shown in FIG. 3, a magnet 28 is disposed within the innermost portion of the bore 26. A pole piece 30 is inserted through the spool bore 26 to the magnet 28. The pole piece 30 is preferably constructed of mechanically and magnetically soft ferrous material. The pole piece 30 may include a reduced end 32 at the distal end, spaced from the magnet 28. The pole piece 30 may be exposed from the housing cover or cap 34.

Figure 1:
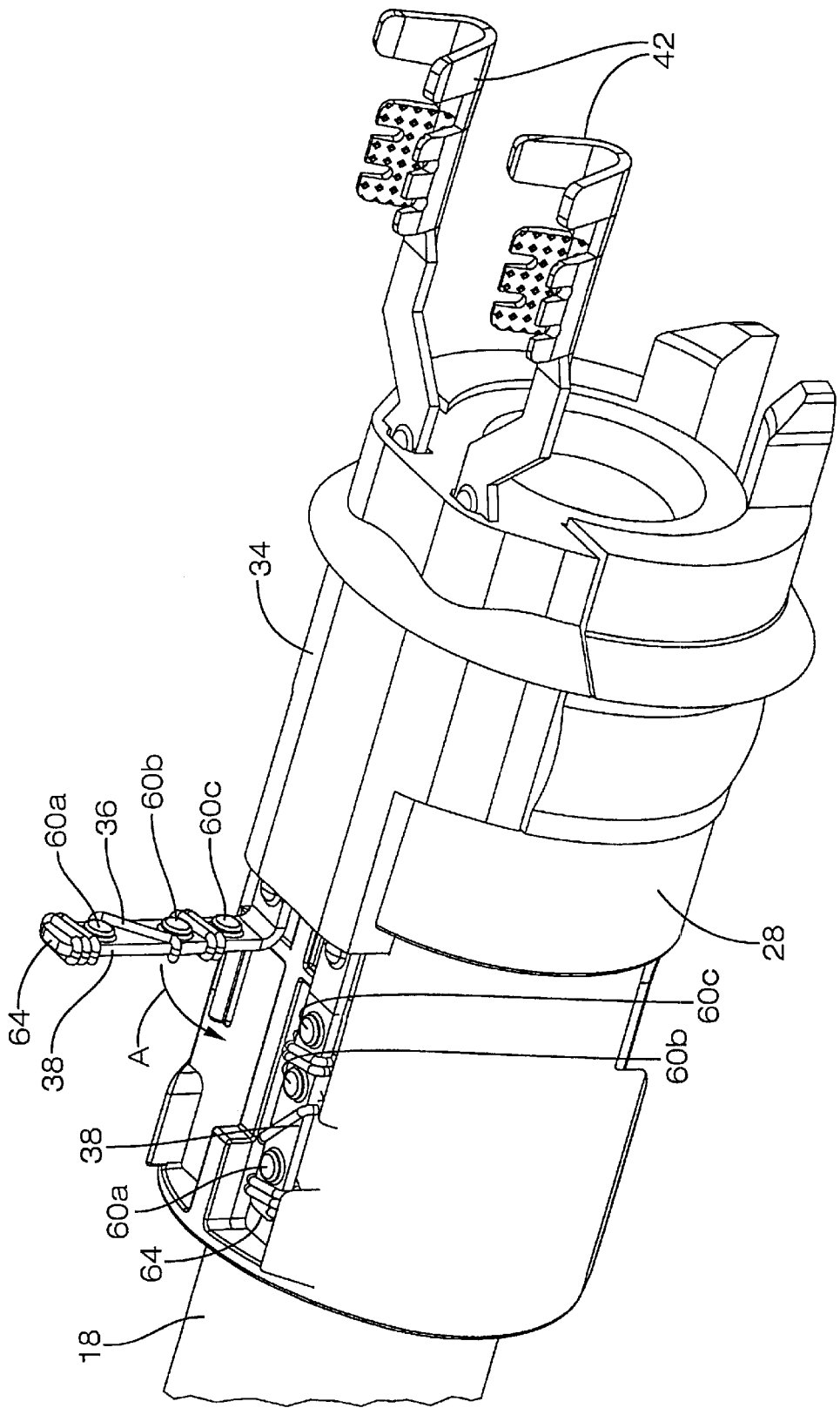
FIG. 1 is a perspective view of a portion of a variable reluctance sensor showing a cut-away portion of a cap for sealing the sensor and other characteristics in accordance with the principal of the present invention.

The magnet wire 20 is wound around the length of the spool barrel 18 between the bottom and front flanges 22, 24 to form a coil. The start and finish wire end sections 36 are each wrapped around individual terminal legs 38 of terminals 40 which are molded onto the spool barrel 18. The wire end sections 36 and the terminal legs 38 are soldered together in a dip solder process. On the opposing ends of the terminals 40 from the terminal legs 38 are connector ends 42, which are adaptable for connection to an external circuit via the electronic harness 12. The connector ends 42 may be crimped as shown in FIG. 1 for connection to the electronic harness 12.

Figure 2:
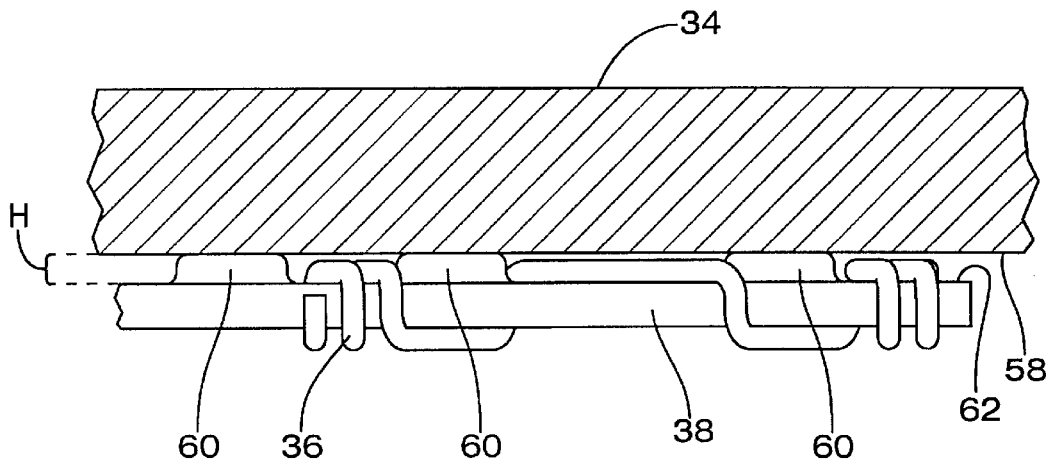
FIG. 2 is an enlarged sectional view of a portion of the sensor showing the cap installed over portions of a terminal of the sensor.

After the magnet wire 20 coil is attached to the terminal legs 38, the terminal legs 38 are moved in the direction A shown in FIG. 2 to place the terminals legs 38 parallel to the spool barrel 18. After the magnet 28 and pole piece 30 are inserted within the spool bore 26, the spool assembly 14 is ready to receive the sensor housing or cap 34.

The hollow sensor housing or cap 34, is preferably made of a thermoplastic resin. The housing or cap 34 is generally a cylindrical body having an opening 44 at one end 46 for receiving the spool assembly 14 and preferably a smaller opening 48 at the opposing end 50 for receiving a portion of the pole piece 30 therethrough. The housing or cap 34 may also include a generally threaded cylindrical exterior portion 52 for connection to a harness holder 54 or other connector communicating with an outside circuit.

The sensor housing or cap 34 is mounted by sliding the cap 34 over the spool assembly 14 until the first end 46 of the cap 34 comes into contact with an expanded stop flange 56 on the spool assembly 14. As can be seen in FIGS. 1 and 3, the area between the exposed surface 62 of the terminal and the cap interior 58 is minimal. In the prior art, as the cap 34 was being installed over the terminals legs 38, the magnet end wire sections 36 were susceptible to be frayed or otherwise damaged by the frictional force of the interior surface 58 of the cap 34 against the wires end sections 36.

The improvement to the electronic sensor 10 is shown more clearly in the schematics of FIG. 1 and FIG. 2. The terminal legs 38 according to the present invention, have bumps or protuberances 60 formed on the terminal surface 62 exposed to the interior surface 58 of the cap 34. There is at least one but preferably two or more bumps or protuberances 60 on each terminal leg 38. The bumps or protuberances 60 are preferably stamped into the terminal leg 38 in a one step process during the manufacturing of the terminals 40. The bumps 60 have a height (H) at least slightly greater than the thickness or diameter of the single strand or bundle of magnet wire 20 wound around the terminal legs 38. The height (H) of the bumps 58 is equal to or slightly less than the clearance allowance between the interior surface 58 of the cap 34 and the exposed terminal surface 62 of the terminal legs 38. The addition of the bumps 60 enables the cap 34 to be mounted over the spool assembly during the encapsulating process without interfering with the wire end sections 36 and thus prevents damage to the magnet wire 20.

The bumps 60 are preferably spaced from each other to allow at least one coil of the magnet wire 20 to be disposed between adjacent bumps 60. It is also preferred to position a first bump 60a (as shown in FIG. 1) proximate to each of the free ends 64 of the terminal legs 38. The distance between the free ends 64 of the terminal leg 38 and the first bump 60a allows a few conventional coil wraps of the end wire section 36 therebetween. A second bump 60b in axial alignment of the first bump 60a on the terminal leg 38 is preferably spaced from the first bump 60a to allow a diagonal coil wrap of the magnet wire 20 therebetween. Subsequent bumps 60c on the terminal leg 38 are positioned in axial alignment to the second bump 60b and spaced from the second bump 60b and adjacent subsequent bumps 60c to allow one or more conventional coil wraps of the end wire sections 36 of the magnet wire 20 therebetween. As shown in FIGS. 1 and 2, the spacing between the first bump 60a and second bump 60b is greater than the spacing between the second bumps 60b and subsequent bumps 60c.

This configuration of the alignment of bumps 60 on the terminal leg 38 allows the wire end sections 36 and terminal legs 38 to be soldered together at the free ends 64 in a dip solder process but allows the remainder portion of the magnet wire 20 on the terminal legs 38 to remain unsoldered and thereby permits expansion and contraction of the magnet wire 20 at its own rate during thermal cycling of the electronic sensor 10. In the prior art, if the solder was not accurately applied, the solder could over extend onto most of the wire end sections 36 and terminal legs 38, which would inhibit the expansion and contraction of the magnet wire 20. Therefore, the placement of the bumps 60 on the terminal leg 38 provides a guide for the application of the solder.

The manufacturing process of the terminal 40 and especially relating to its terminal legs 38 eliminates steps taken in the prior art during the assembly of the variance reluctance sensor 10 to protect the magnet wire 20. Since the bumps 60 are preferably stamped onto the terminal legs 38 in a one step process during the manufacturing of the terminals 40, the assembly process of the electronic sensor 10 is not hindered or encumbered by requiring further additional steps to protect the magnet wire 20 and terminals 40.

Although the improvement to the terminal of a sensor is illustrated in the environment of the variable reluctance sensor 10 as shown in the figures, the bumps or protuberances 60 as disclosed may be added to the terminal legs of any electronic sensor embodiment utilizing coiled magnet wire 20. Further, while the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit. and scope of the appended claims, which scope is to be accorded the broadest interpretation so as to encompass all such modifications and equivalent structures as is permitted under the law.

What is claimed is:

1. An improved electronic sensor having a spool assembly including a spool with a bore therein for receiving a pole and a magnet adjacent said pole, said spool having a magnet wire wound thereon to form a coil, said magnet wire including one of a single strand wire and a bundle of wire, ends of the magnet wire each wound around a respective electrically conductive leg of a terminal for electrical output from said coil to an external circuit, said sensor having a cap for sealing over said spool assembly and legs of the terminal, said cap having an interior surface adjacent said spool assembly and terminal legs, the improvement comprising:

said terminal legs having an exposed surface with at least one bump thereon adjacent the interior surface of the cap.

2. The improved sensor of claim 1, wherein the at least one bump is stamped onto the terminal leg.

3. The improved sensor of claim 1, wherein at least two bumps are formed on the exposed surface, the at least two bumps are spaced along the terminal legs, wherein a portion of the magnet wire is wound between the bumps.

4. The improved sensor of claim 3, wherein the terminal leg has a free end positioned adjacent to the spool, and a first bump of the at least two bumps is positioned adjacent to the free end of the terminal leg and wherein another portion of the magnet wire is wound between the free end of the terminal leg and the first bump.

5. The improved sensor of claim 4, wherein the first bump is spaced from the adjacent bump.

6. The improved sensor of claim 5, wherein a portion of the magnet wire is wound diagonally around the terminal leg between the first bump and the adjacent bump.

7. The improved sensor of claim 1, wherein the height of the bump is greater than the thickness of the magnet wire wound around the terminal leg.

* * * * *